US006609657B2

(12) United States Patent
Pires

(10) Patent No.: US 6,609,657 B2
(45) Date of Patent: Aug. 26, 2003

(54) SYSTEM FOR ENTRAPPING OBJECTS

(75) Inventor: Manuel Pires, Southbury, CT (US)

(73) Assignee: Morse Watchmans, Inc., Oxford, CT (US)

( * ) Notice: Subject to any disclaimer, the term of this patent is extended or adjusted under 35 U.S.C. 154(b) by 131 days.

(21) Appl. No.: 09/915,938

(22) Filed: Jul. 25, 2001

(65) Prior Publication Data

US 2003/0019926 A1 Jan. 30, 2003

(51) Int. Cl.[7] .................................................. G06K 5/00

(52) U.S. Cl. ....................... 235/382; 235/375; 235/381; 235/382; 235/383; 235/385

(58) Field of Search ................................. 235/375, 381, 235/382, 383, 385, 451

(56) References Cited

U.S. PATENT DOCUMENTS 4,812,985 A 3/1989 Hambrick et al.
5,038,023 A 8/1991 Saliga
5,212,649 A 5/1993 Pelletier et al.
5,231,272 A 7/1993 Mardon
5,996,896 A 12/1999 Grabon
6,131,808 A 10/2000 Pires et al.
6,195,005 B1 2/2001 Maloney
6,431,438 B1 * 8/2002 Pires et al. ................. 235/375

* cited by examiner

*Primary Examiner*—Karl D. Frech
*Assistant Examiner*—Daniel A. Hess
(74) *Attorney, Agent, or Firm*—Carmody & Torrance LLP

(57) ABSTRACT

A storage system for storing and entrapping a plurality of objects comprising a system housing; smartkey housings operable to receive and releasably lock a smartkey therein; recesses, each of which is associated with a respective smartkey housing; and a plurality of smartkeys, each of which is associated with an object. Each smartkey comprises a body; a memory device comprising an individualized code; and an entrapping arm, coupled to the body, for entrapping an object positioned in the recess associated with the smartkey housing. When the object is positioned within its respective recess and the smartkey is positioned and locked in the smartkey housing associated with the recess, the entrapping arm prevents the object from being removed from the associated recess until the smartkey is removed from its respective smartkey housing at which time the object is removable from the recess. Alternatively, the storage system may comprise chambers each associated with a smartkey housing, wherein each chamber has coupled thereto a door panel positionable in an open position where objects can be placed inside and at least a closed position where objects can be retained therein, wherein the entrapping arm of the smartkey entraps the door in a closed position when the smartkey is positioned in the smartkey housing, thus preventing the door from opening until the smartkey is removed from its respective smartkey housing.

21 Claims, 9 Drawing Sheets

SYSTEM FOR ENTRAPPING OBJECTS

BACKGROUND OF THE INVENTION

The present invention relates generally to systems for storing objects, and in particular, to all improved system that additionally entraps and maintains at least partially out of view, one or more objects, so as to further prevent the unauthorized copying or obtaining of information associated with the object itself.

Systems for storing objects are well known. One such well known and commercially successful system being disclosed in U.S. Pat. No. 6,131,808, commonly owned by the present assignee, the disclosure of which is incorporated by reference as if fully set forth herein. A familiarity with the technology can be ascertained by a review of U.S. Pat. No. 6,131,808.

Although a commercially successful product, one of the perceived deficiencies in the aforementioned system is the inability to effectively and simultaneously prevent unscrupulous individual(s) from obtaining valuable information about the objects, notwithstanding the fact that the objects may be stored in the system. For example, even if the objects are being secured and stored in the prior art system, sophisticated technology available today permits the coping of information on the object (such as for example, if the object is a key or credit/access card) merely by visually inspecting the object or merely by virtue of having physical access to the object, notwithstanding the inability to actually remove the object from its coupling or connection to its associated identification device (i.e. “smartkey”). For example, the ability to make an imprint of a key or download valuable information from an access/credit card is now available merely by visually inspecting or physically touching the particular object. Such deficiencies must be overcome, for example, to effectively and reliably ensure that only authorized individuals are provided with access to areas of buildings and other facilities where keys or access cards provide such authorization. It can thus be seen that it is important, due to the availability of sophisticated equipment, to prevent reproduction or the obtaining of security information from the key or access/credit cards, even if the key or card remains secure in its associated station assembly (i.e. “smartkey” housing). Accordingly, a way to store such cards or keys (or numerous other objects) for proper access while simultaneously ensuring that information contained on or in the object is not unscrupulously obtained, is of paramount concern.

One known construction that prevents all users, authorized or not, from visually inspecting the object, is described in U.S. Pat. No. 6,195,005. However, Applicant believes there are perceived deficiencies in the construction set forth therein, and a desire to overcome such deficiencies is also desired.

Accordingly, an improved system for entrapping objects that overcomes the aforementioned deficiencies and achieves the objectives and advantages set forth above and below is desired.

OBJECTS AND SUMMARY OF THE INVENTION

Therefore, it is an object of the present invention to provide an improved system for entrapping objects.

It is another object of the present invention to provide an improved system for entrapping objects that can effectively store such objects for proper access while simultaneously ensuring that information contained on or in the object is not unscrupulously obtained.

Yet another object of the present invention to visibly hide at least a portion of the object intended to be stored and entrapped so as to make it significantly more difficult or impossible to obtain information associated with the object, notwithstanding that the object cannot actually be removed from the system.

It is a further object of the present invention to entrap keys and cards, such as, but not limited to, access cards and credit cards, more effectively and with more security reliability.

It is yet another object of the present invention to provide a system that can store and entrap bulky objects or objects that are not readily connectable to a smartkey, such as;, but not limited to, medicine or the like.

Still other objects and advantages of the invention will in part be obvious and will in part be apparent from the specification.

The invention accordingly comprises the features of construction, combination of elements and arrangement of parts that will be exemplified in the disclosure hereinafter set forth, and the scope of the invention will be indicated in the claims.

Generally speaking, the present invention is directed to an improved storage system for storing and entrapping a plurality of objects. In a preferred embodiment, the system comprises a system housing; at least two smartkey housings, each of which disposed within the system housing and operable to receive and releasably lock a smartkey therein; at least two recesses, each recess being associated with a respective smartkey housing; and at least two smartkeys, each of which is associated with an object. Each of the smartkeys preferably comprises a body; a memory device coupled to the body and comprising an individualized code; and an entrapping arm, coupled to the body, for entrapping an object positioned in the recess associated with the smartkey housing. When the object is positioned within its respective recess and the smartkey is positioned and locked in the smartkey housing associated with the recess, the entrapping arm prevents the object from being removed from the associated recess until the smartkey is removed from its respective smartkey housing at which time the object is removable from the recess.

In a further preferred embodiment, the system includes a plate, coupled to the system housing, wherein the recesses are each formed within the plate. Each recess may be elongated so as to accept an object that is at least essentially the shape of a credit card, or may be shaped so as to accept an object that is at least essentially the shape of a key. The recess may be dimensioned so as to prevent a visual inspection of the entire object when the object is disposed in the recess. The object may also be coupled, or even directly connected, to the entrapping arm. Yet further, inserts may be provided and positioned within each of the at least two recesses, wherein the objects are disposed wit the inserts when the inserts are positioned within the recess of the plate.

In yet another preferred embodiment, the smartkey comprises a coupler for coupling the entrapping arm to the body. In this embodiment the entrapping arm further comprises a unique identifier, whereby if the entrapping arm is destroyed, damaged or decoupled from the body, an identical replacement-entrapping arm will be significantly difficult to obtain. In this embodiment, the entrapping arm may have surface indicia to indicate the unique identifying information.

And, in yet another embodiment of the invention, the storage system may comprise chambers, each of which is associated with a smartkey housing. In this embodiment, each chamber has coupled thereto a door panel positionable in an open position where objects can be placed inside and at least a closed position where objects can be retained therein. Here, the entrapping arm entraps the door in a closed position when the smartkey is positioned in the smartkey housing, wherein the entrapping arm prevents the door from opening until the smartkey is removed from its respective smartkey housing. The door may also include a slotted opening through which an object can be at least partially inserted. For example, the opening may be dimensioned so as to accept at least a portion of a key positioned therein and to prevent a visual inspection of information associated with the key when the key is positioned in the slotted opening, all while maintaining the closure of the chamber.

BRIEF DESCRIPTION OF THE DRAWINGS

For a fuller understanding of the invention, reference is made to the following description taken in connection with the accompanying drawings, in which.

Identically labeled elements appearing in different ones of the above-described figures refer to the same elements but way not be referenced in the description for all figures.

DETAILED DESCRIPTION OF THE PREFERRED EMBODIMENTS

Generally speaking, the present invention is an improvement over the system that is described in U.S. Pat. No. 6,131,808 which is commonly owned by the present assignee. Of course, with the exception of the details of the present invention, U.S. Pat. No. 6,131,808 provides a complete disclosure of the electronics, software and hardware features, construction and operations of the present invention. Accordingly, the entire U.S. Pat. No. 6,131,808 is incorporated by reference as if fully set forth herein.

Figure 1:
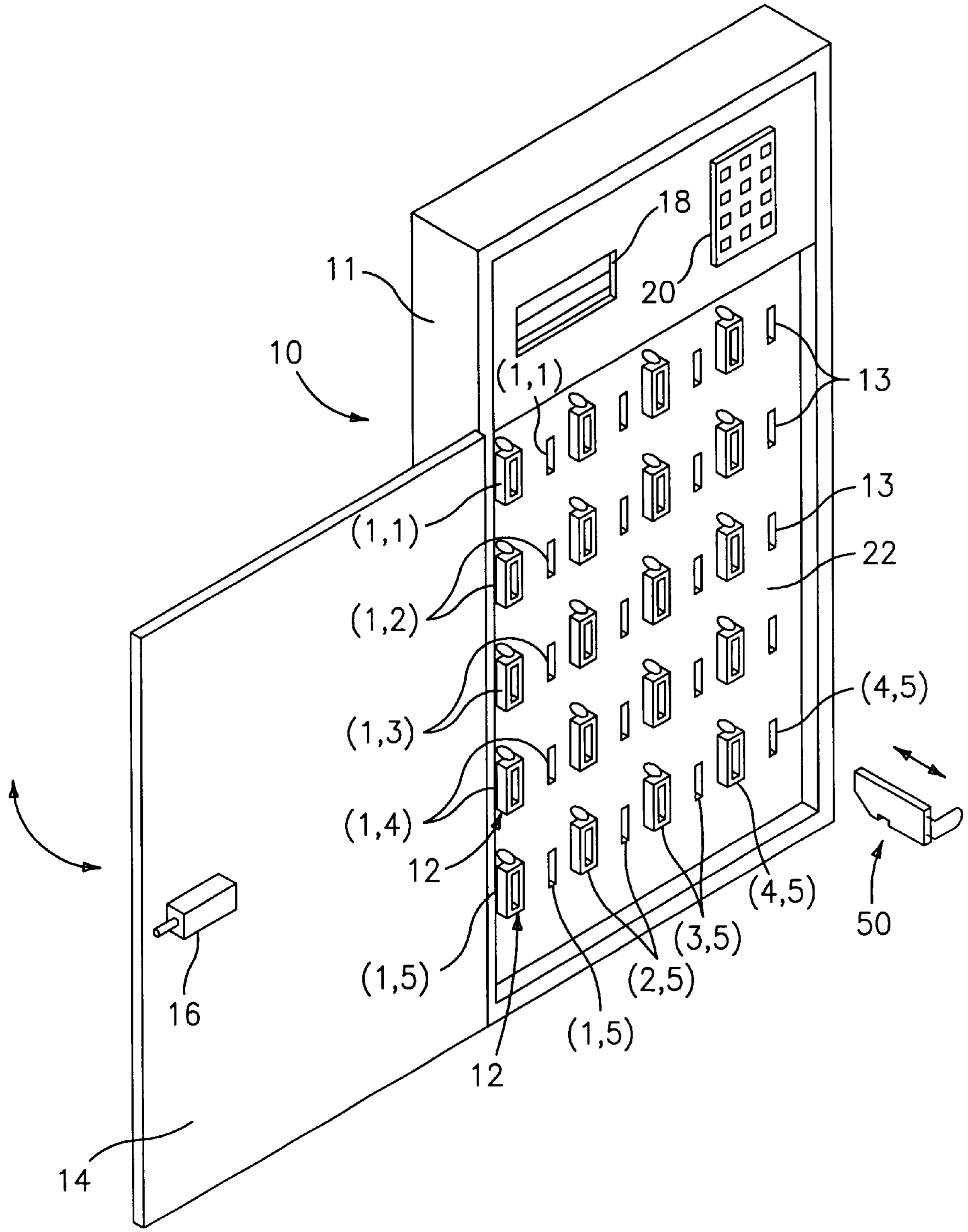
FIG. 1 is a perspective view of a system for entrapping objects constructed in accordance with the present invention.

Reference will first be made to FIG. 1 wherein a system for storing and entrapping objects, generally indicated at 10, is disclosed. Generally speaking, system 10 includes a plurality of smartkey housings, generally indicated at 12. For convenience, it should be understood that the smartkey housings 12 can be particularly identified herein by reference to a column and row number (c,1) as exemplary illustrated in FIG. 1. A smartkey, generally indicated at 50, constructed in accordance with the present invention, is also illustrated in FIG. 1, It should be understood that smartkey 50 is releasably received and insertable (and thereafter releasably locked) within anyone of the smartkey housings 12, all as set forth in U.S. Pat. No. 6,131,808 (hereinafter the "'808 patent"). A door 14 with a lock 16 (and corresponding latch (not shown)) may be hingedly coupled to the system's housing 11 in a known manner, so as to provide increasing security and protection of the objects stored and entrapped within system 10. A display 18 and a keypad 20 may also be provided as set forth in the '808 patent. Such features are not material to the present invention.

FIG. 1 also illustrates that each of the smartkey housings 12, of which there may be many as the number thereof is a matter of design choice, are disposed with system housing 11, Preferably, system 10 also includes a plate 22, coupled to system housing 11, through which the front end of each smartkey housing 12 may extend. Plate 22 preferably includes a plurality of recesses 13. The mounting assembly of smartkey housings 12 on plate 22 is further detailed in the '808 patent.

Each smartkey housing 12 preferably has associated therewith one recess 13. In a similar manner, each recess can also be particularly identified herein by reference to a column and row number (c,1). As illustrated, smartkey housing 12 identified by location (1,1) is associated with recess 13 that is also identified by designation (1,1). Preferably, each smartkey housing has associated therewith an associated recess, but it is conceivable, and clearly within the scope of the present invention, that not all smartkey housings 12 have an associated recess 13. For example, a portion of system 10 may be configured merely in the manner as set forth in FIG. 1 of the '808 patent.

Figure 2:
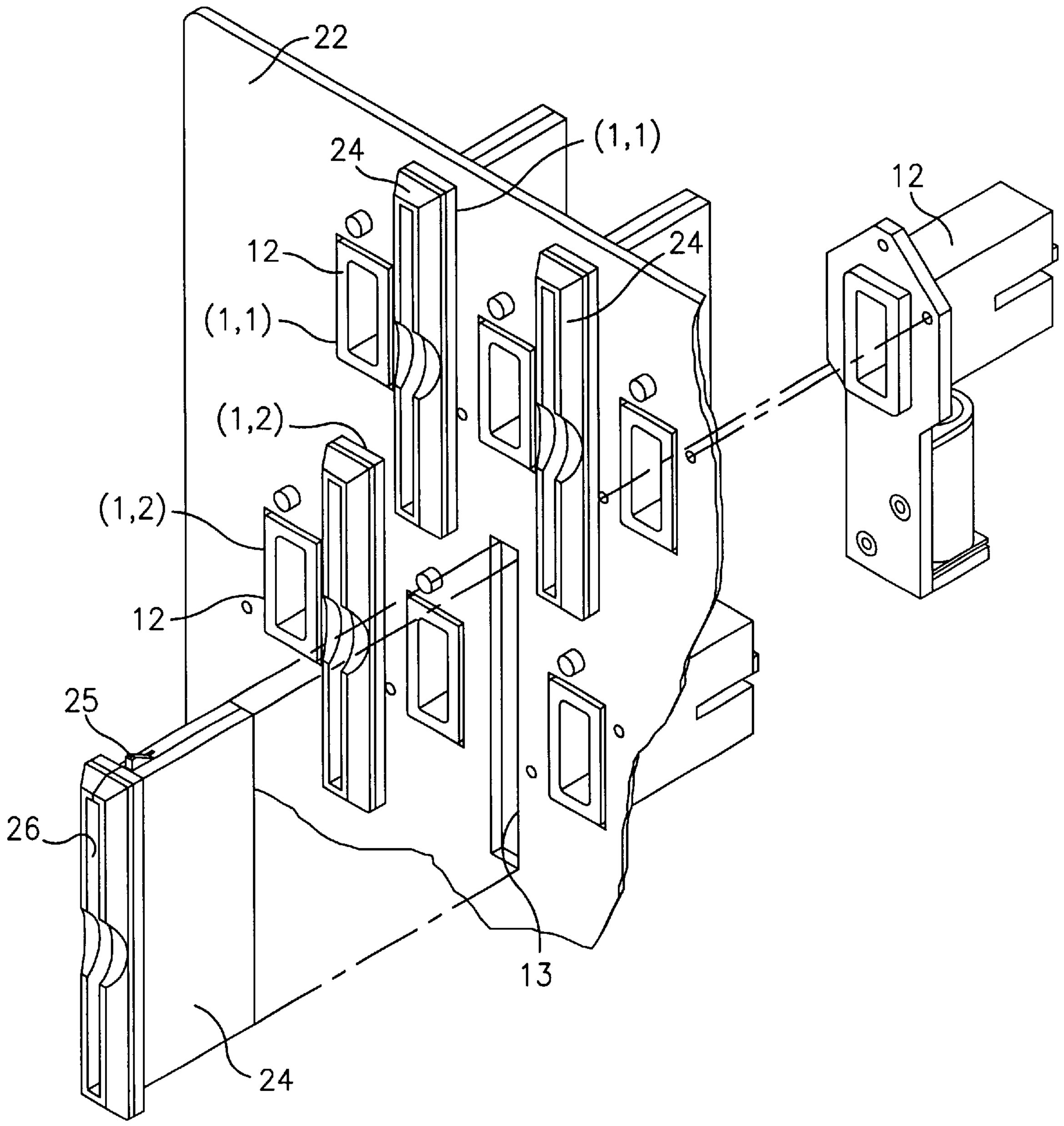
FIG. 2 is an exploded perspective view of a portion of the system illustrated in FIG. 1 constructed in accordance with the present invention.
Figure 3:
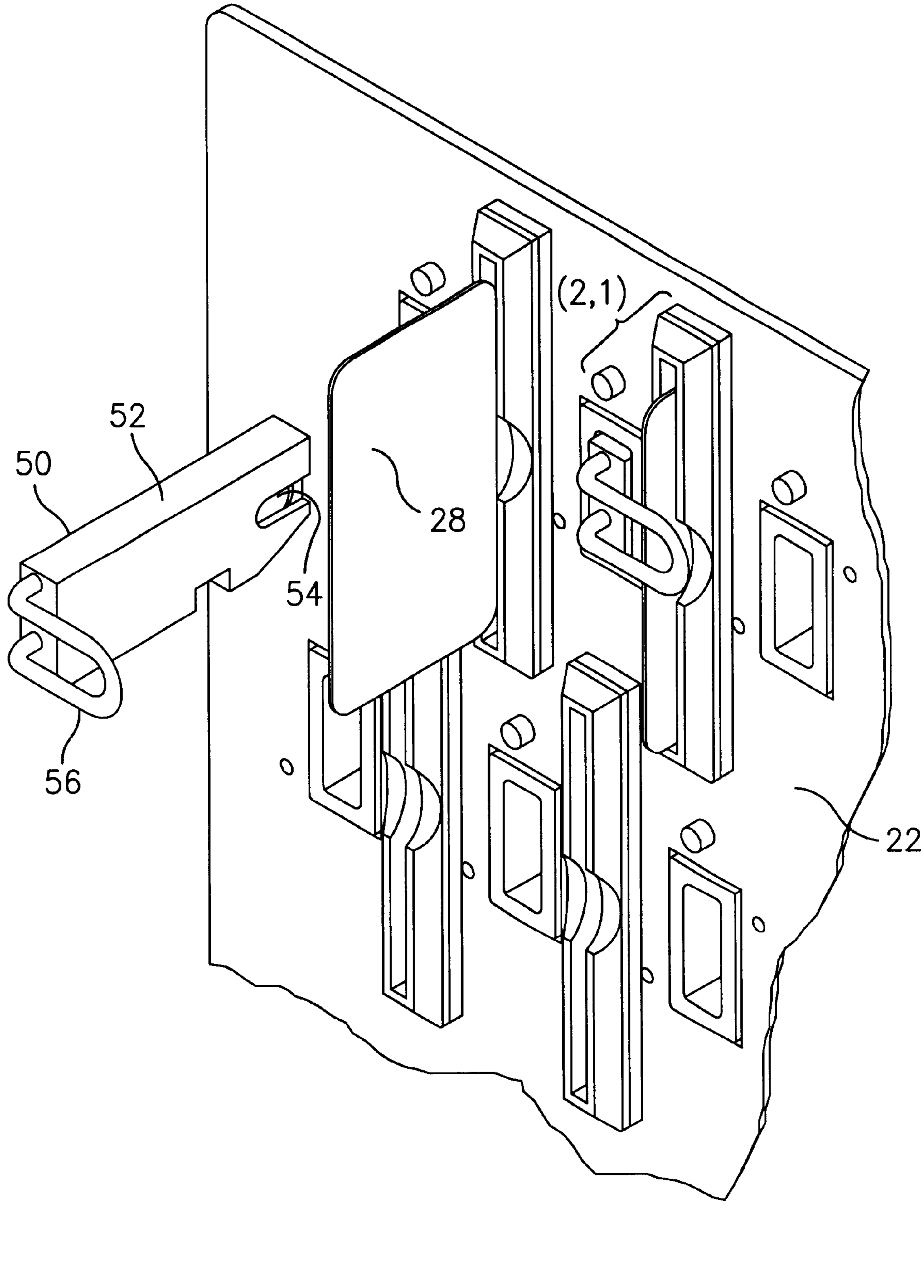
FIG. 3 is a non-exploded perspective view of the portion of the system illustrated in FIG. 2.

Reference is now made to FIGS. 2 and 3 for a more detailed description of the present invention, although it is clear that these FIGS. 2 and 3 only illustrate a portion of the present invention. First, as a matter of design choice and not limitation, it can be seen that the smartkey housings 12 and its associated recesses 13 may be slightly staggered although a pattern of row and columns can still be accurately illustrated as in the Figures. The embodiment illustrated in FIGS. 2 and 3 is configured to permit recesses 13 to receive cards, such as access cards or credit cards. Accordingly, it can clearly be seen that recesses 13 are elongated in shape.

Preferably, each recess 13 includes an insert 24 that is positionable therein. A depressible spring-biased latch 25 may be utilized to ensure the coupling of insert 24 in the recess against plate 22. There may also be a corresponding locking mechanism (not shown) positioned behind plate 22 to ensure that each insert 24 is securely locked to plate 22 within each recess 13. Preferably, each recess 13 is provided with an insert 24. Each insert has an opening 26 dimensioned to receive a desired object 28. In the embodiment of FIGS. 2 and 3, object 28 is a card, such as an access card or credit card.

Preferably, recess 13 (if no insert 24 is used) or opening 26 (if an insert 24 is used) is dimensioned so as to prevent a complete visual inspection of the entire object 28 when object 28 is disposed therein. In this way, there is au increased prevention of any unauthorized review, scanning or otherwise retrieval of information associated with the object since the material portion of the object will be hidden from view within the recess 13 or opening 26, as shown by the smartkey/insert pair (2,1) of FIG. 3.

Now with particular reference to FIG. 3, smartkey 50 is generally comprised of, three elements; namely, a body 52, a memory device 54 coupled thereto, such as an electronic memory device, details of which are set forth in the '808 patent, and an entrapping arm 56 which is also coupled to body 52. Entrapping arm 56 may be coupled to body 52 in a similar manner as the wire is coupled to the smartkey's housing in the '808 patent. Alternatively, simple mechanical changes, such as the use of welding or adhesives, may be implemented in a known manner as arm 56 in the present invention is preferably made of steel. As can be readily seen in FIG. 3, entrapping arm 56 entraps object 28 positioned in insert 24. Specifically, when object 28 is positioned within its respective recess 13 (or opening 26) and smartkey 50 is positioned and releasably locked in a smartkey housing 12 (all as disclosed in the '808 patent) which itself is associated with a particular recess 13, entrapping arm 56 prevents object 28 from being removed from the associated recess 13 (or opening 26). Further, when smartkey 50 is delocked and removed from its respective smartkey housing 12, object 28 can then be removed from its respective recess 13 (or opening 26 of insert 24).

Figure 4:
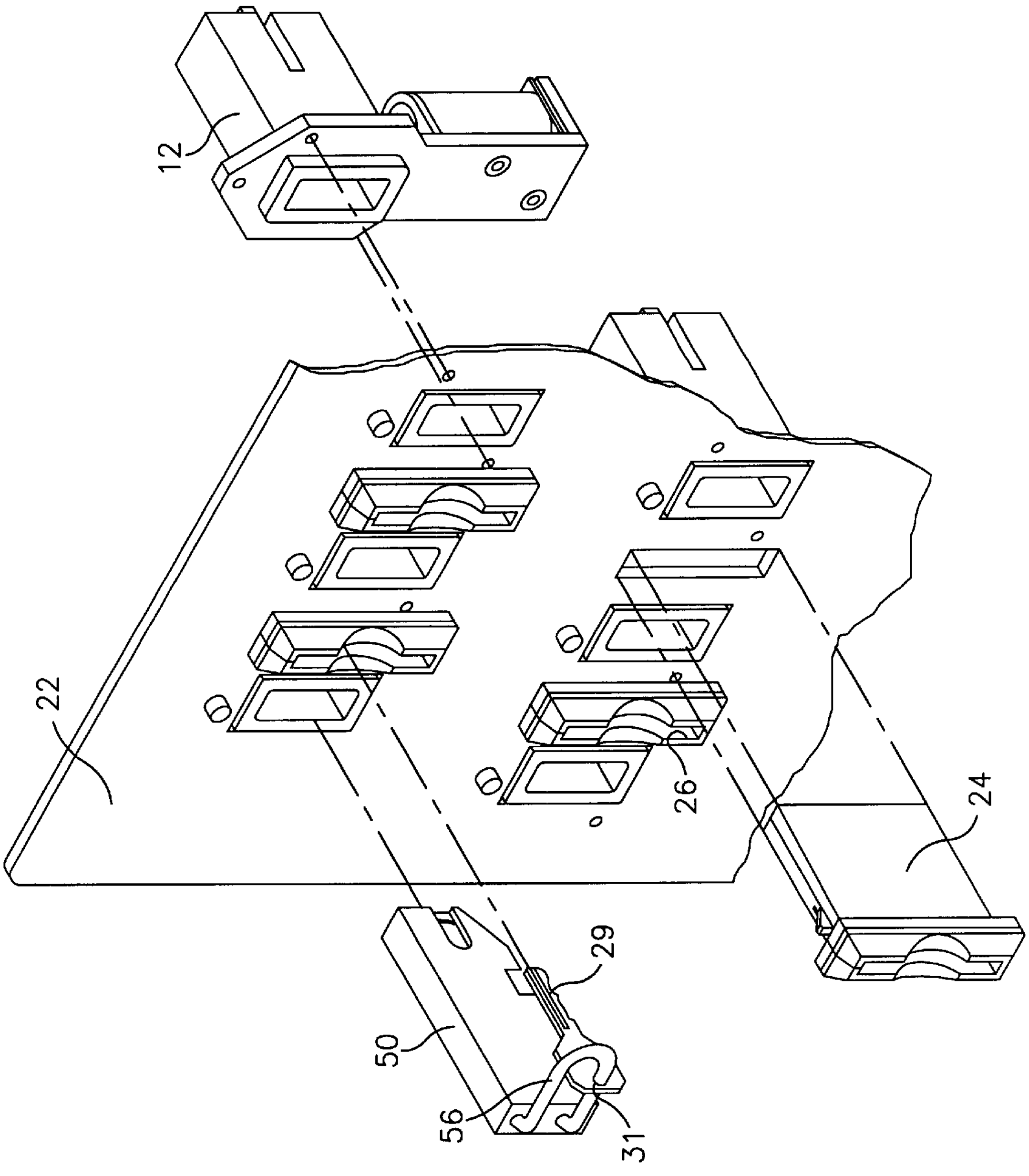
FIG. 4 is a perspective view of a portion of the system illustrated in FIG. 1 constructed in accordance with a second embodiment of the present invention.
Figure 5:
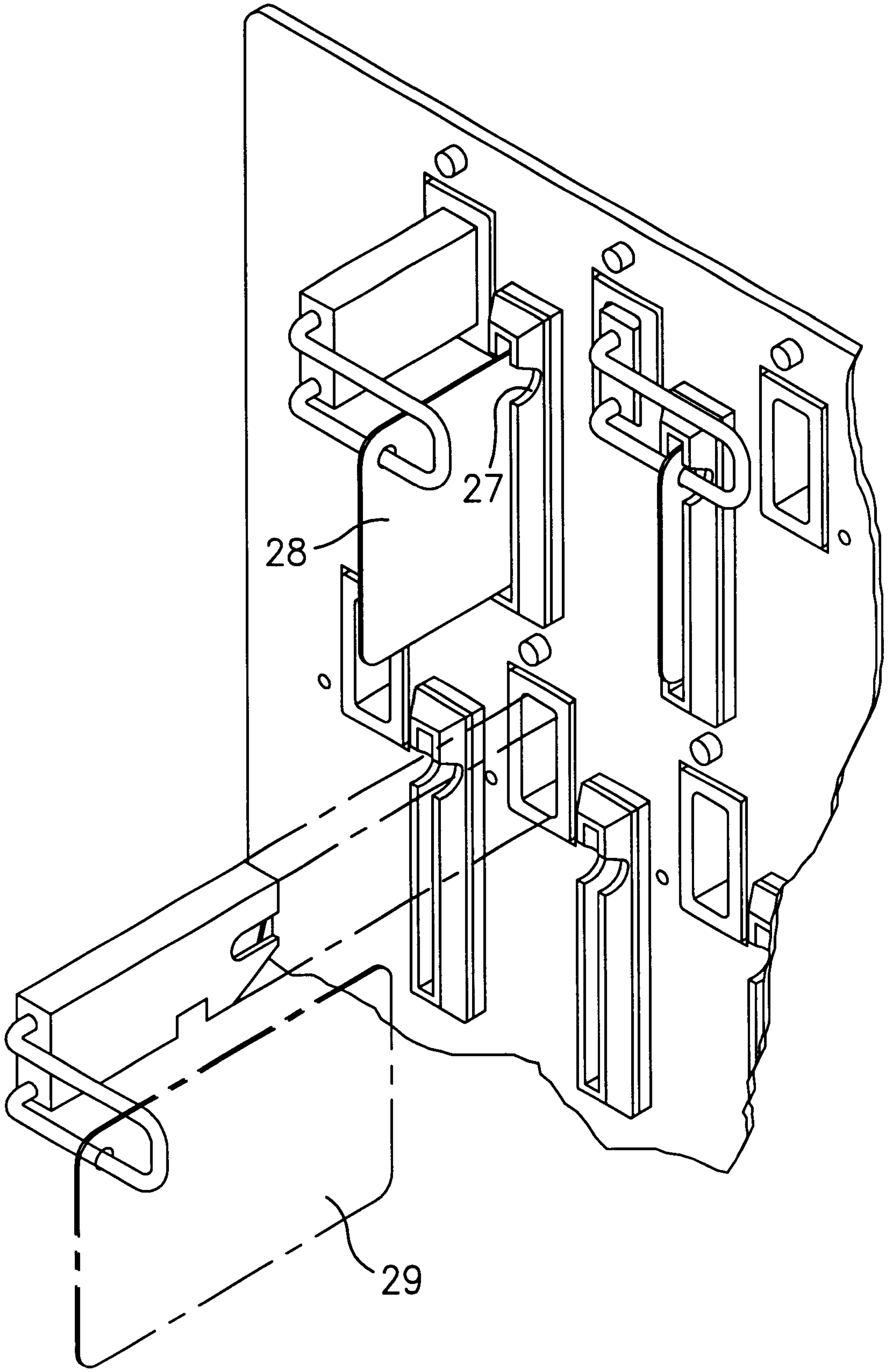
FIG. 5 is a perspective view of an alternate embodiment constructed in accordance with the present invention, utilizing much of the construction of tat portion of the system illustrated in FIGS. 2 and 3 and at least one feature illustrated in FIG. 4.

Reference is now made to FIG. 4, in which a second embodiment of the present invention is disclosed. Generally speaking, this second embodiment is identical to the first-mentioned embodiment in many respects, the largest distinction being that openings 26 in inserts 24 may be dimensioned to accept a smaller object 29, in this example, a key. In this embodiment, as well as in the first embodiment (FIG. 5), object 28 or 29 may be coupled or directly connected to entrapping arm 56, through, by example, an aperture 31 in object 29. This is an additional measure of security if desired. As illustrated, entrapping arm 56 can be formed in a plurality of shapes. If needed, a notch 27 can be formed in insert 24 to accommodate any portion of arm 56 to prevent interference between arm 56 and insert 24 (see FIG. 5). In this way, smartkey 50 and the object 29 would need to travel together.

Figure 6:
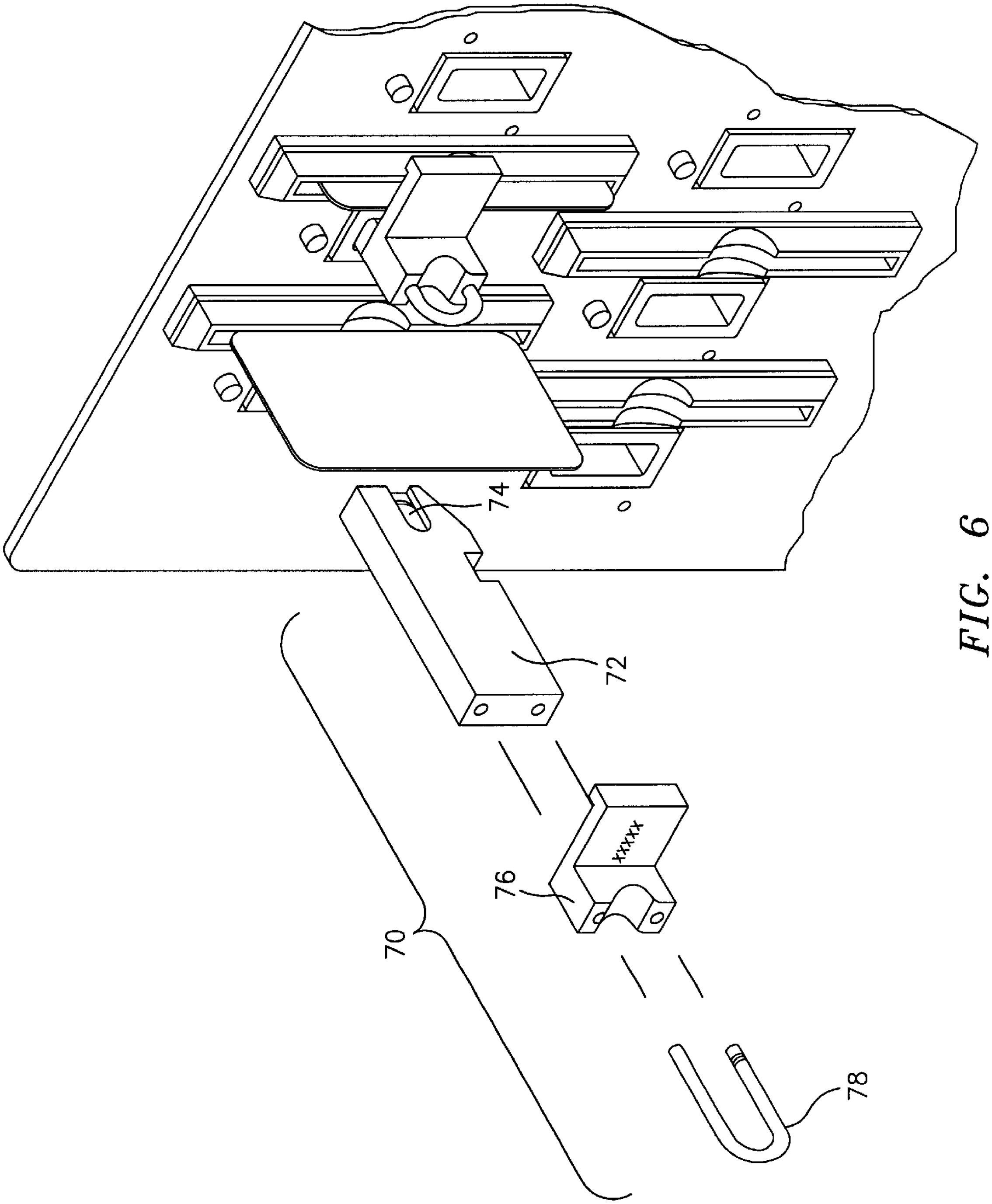
FIG. 6 is a perspective view of a portion of the system of FIG. 1 of yet another embodiment constructed in accordance with the present invention, utilizing at least some of the construction of that portion of the system illustrated in FIGS. 2 and 3.

Reference is now made to FIG. 6, which illustrates yet another embodiment constructed in accordance with the present invention. FIG. 6 highlights the alternative embodiment of the smartkey, generally indicated at 70. In this embodiment, again, smartkey 70 preferably comprises a body 72, a memory device 74, such as electronic memory device, coupled thereto, and an entrapping arm 76, in the general shape of a straightened "Z." A coupler 78 may be provided for coupling entrapping arm 76 to body 72, Arm 76 may itself also be adhered, by adhesive or the like, to body 72. Coupler 78, like entrapping arm 56 of the earlier embodiments, may be secured to body 72 in a similar manner as element 61 is secured within the smartkey described in the '808 patent. The advantage of this alternate embodiment is that it is conceivable that the entrapping arm 76 may be broken and replaced by an unscrupulous individual, The idea behind entrapping arm 76 is that it will be color-coded or have some other unique indicia (such as a serial number) thereon so that, should entrapping arm 76 be tampered with (i.e. broken or damaged), it would be quite hard to avoid detection thereof, since it would be quite obvious that the proper identification indicia is not associated with the entrapping arm 76. This is a significant improvement over the present state of the an since a replacement arm corresponding to entrapping arm 56 may be more generic and readily available in the marketplace to copy.

Figure 7:
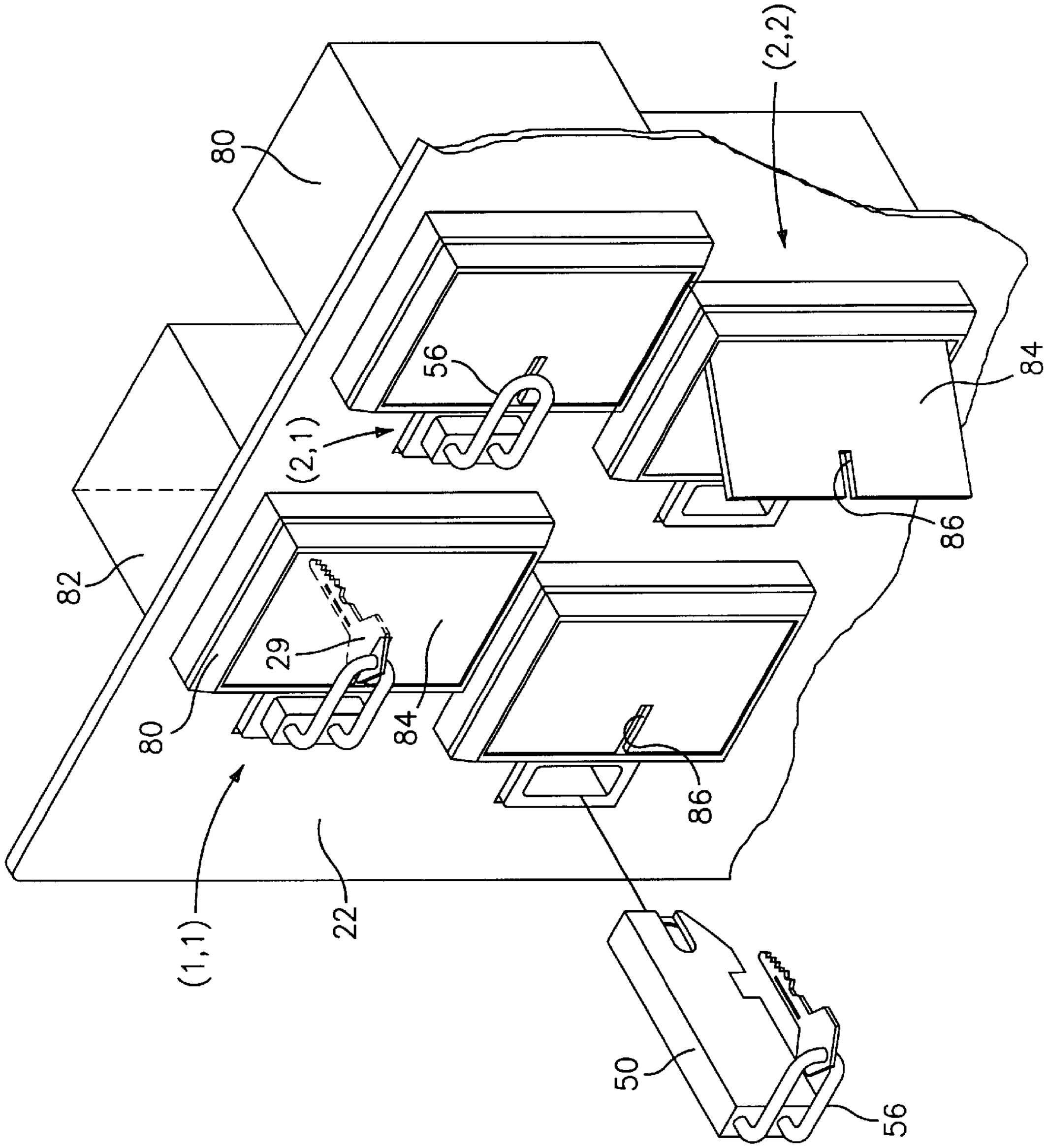
FIG. 7 is a perspective view of a portion of the system of yet another embodiment constructed in accordance with the present invention.

Lastly, reference is now made to FIG. 7 wherein a still further embodiment constructed in accordance with the present invention is disclosed. In this alternate embodiment, each insert 24 has been replaced with a chamber, generally indicated at 80. Each chamber 80 may be snapped, glued, welded or otherwise coupled to plate 22. That is, it should be understood that the recesses 13 in plate 22 may be dimensioned to receive a larger insert, such as a chamber 80. Chamber 80 should be understood to include side and back walls 82 and a front door 84, which itself may be hingedy coupled to chamber 80 in a known manner (see chamber at position 2,2). Chamber 80 may also be made of steel and may have a transparent or opaque door, depending on whether it is desired to be able to visually inspect and/or confirm that he objects are actually within the chamber.

Smartkey 50 may be constructed in an identical manner to smartkey 50 of FIG. 4. The embodiment illustrated in FIG. 7 is advantageous in several ways. Foremost, it can be seen that entrapping arm 56 of smartkey 50 (when disposed and releasably locked in any smartkey housing 12), will maintain the closure of door 84. This exemplary closed configuration can be seen in smartkey/chamber pair located at column, row (2,1). In this way, any object, such as prescription medicine, additional keys or any other bulky objects, that can fit within chamber 80 can be entrapped therein in a manner consistent with the embodiments disclosed herein. Still further, door 84 may have provided therein a slot 86 through which an object, such as key 29, can partially pass. In this way, both a key (or card 28 if the slot is configured/shaped accordingly) and other bulky objects can be simultaneously stored within system 10 (see chamber 80 located at position (1,1)). It should be understood tat in this embodiment of FIG. 7, door 84 cannot close an object (such as key 29) attached to entrapping arm 56 therein since the slot 86 permits object 29 to slide in and out thereof. In this manner, use of slot 86 is similar in construction to the recess 13 or insert 26 that is merely shaped to receive the object 29 therein. Advantageously, the embodiment of FIG. 7 also provides for the prevention of visually inspecting the object that may be coupled to the entrapping arm 56 as well as the prevention of visually inspecting the objects that are safely entrapped within chamber 80 when smartkey 50 is disposed and releasably locked within the smartkey housing 12.

The operation of the present invention can be understood from a reading of co-owned U.S. Pat. No. 6,131,808 wherein it is clearly disclosed in detail the manner in which an authorized user can obtain the release of one or more selected smartkeys from their locked positions in the smartkey housings. However, as detailed here it is now not necessary to actually connect the object to the wire or other entrapping arm material, as the entrapping arm now entraps the object in the insert or recess until such time as the smartkey is released in the manner disclosed in the '808 patent. In this way, both the object may remain hidden from view and more bulk items, other than a single key, can more effectively be stored and entrapped as set forth herein.

Figure 8:
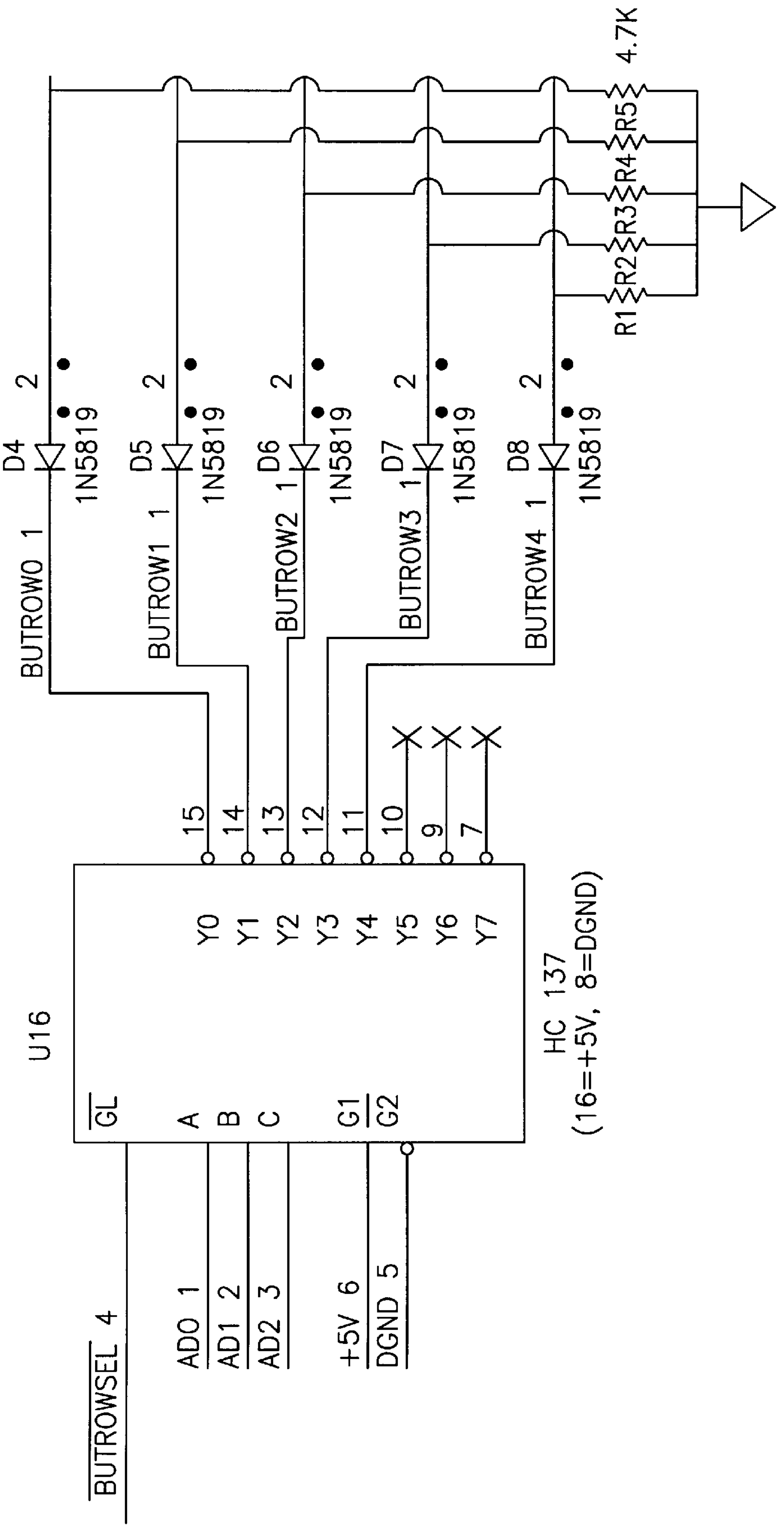
FIGS. 8 and 9 are schematic diagrams illustrating minor changes in circuit design from that disclosed in co-owned U.S. Pat. No. 6,131,808, incorporated herein by reference.
Figure 9:
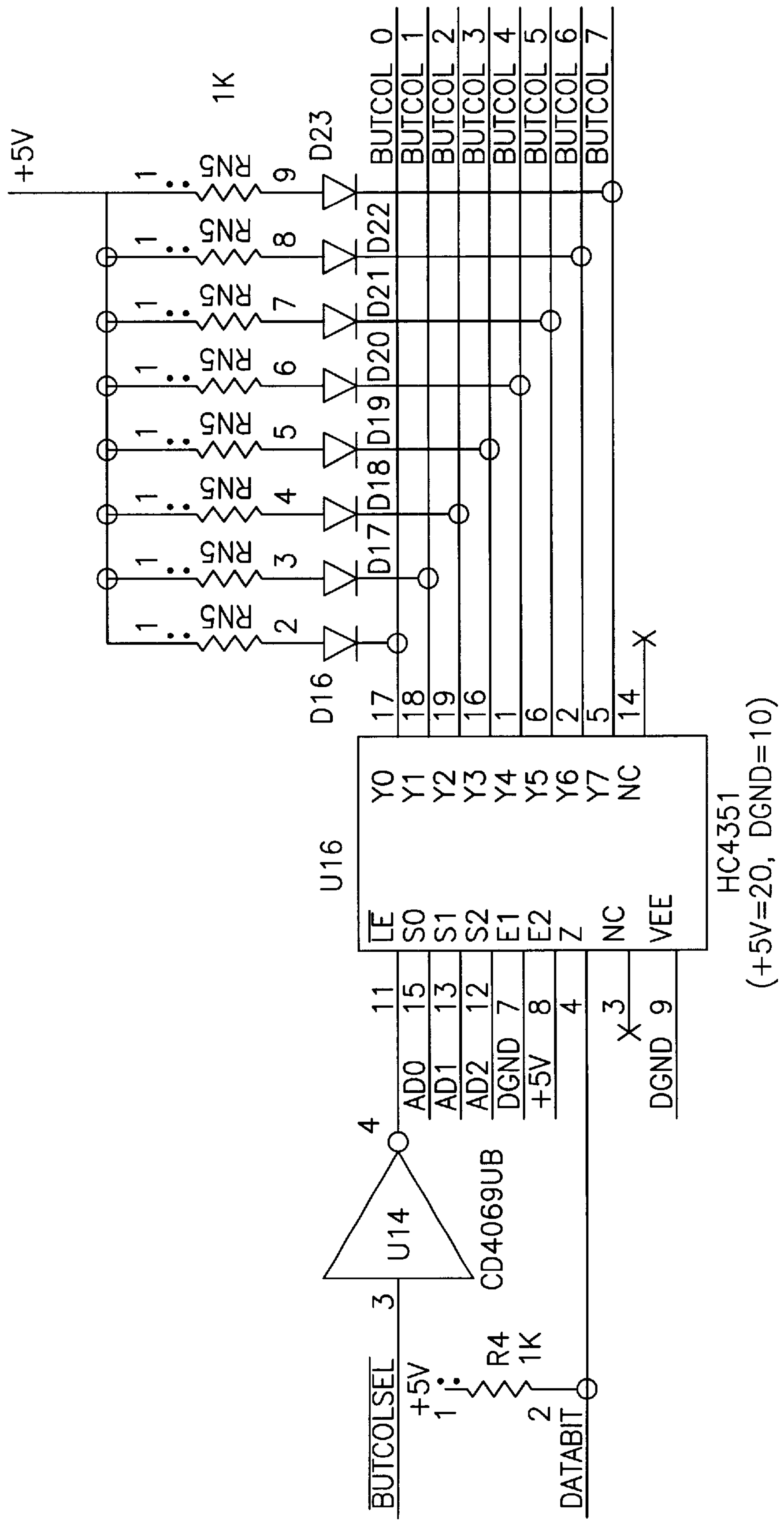

Still further, to comply with the requirements of 35 U.S.C. §112, the following is set forth. Specifically, shortly after the initial filing in July 1993 of the application that matured into U.S. Pat. No. 6,131,808, several improvements (unrelated to the prevent invention) were made to improve the operation and function of the invention disclosed and claimed in the '808 patent. These improvements are set forth in FIGS. 8 and 9 hereof and correspond To FIGS. 27 and 28, respectively, of the '808 patent. With reference to FIG. 8, resistors R1–R5 were added in the manner shown. With reference to FIG. 9, diodes D16–D23 were added as shown.

The function of these components would be understood by one skilled in the art and are omitted for brevity. Lastly, an inadvertent and insignificant error was noted in FIG. 28 of the '808 patent. Specifically, the common node of resistors RN5 should be tied to the voltage source, namely +5V. This is corrected in the attached FIG. 9. One skilled in the art would clearly notice this error and would readily notice that these resistors would indeed need to be connected to a positive voltage source. Details of FIGS. 8 and 9 are omitted as they are sufficiently detailed in the '808 patent.

A system constructed in accordance with the foregoing detailed description, which includes the description of the '808 patent incorporated herein by reference, provides an improved system for entrapping objects that can effectively store such objects for proper access while simultaneously ensuring that information associated with the object is not unscrupulously obtained. For example, the present invention provides for the ability to visibly hide at least a portion of the object intended to be stored and entrapped so as to make it significantly more difficult or impossible to obtain information associated with the object, notwithstanding that the object is being stored and entrapped. Furthermore, the invention constructed in accordance with the foregoing provides for the improved ability to entrap objects, such as but not limited to keys and cards (such as access cards and credit cards) more effectively and with more security reliability. Additional, the present invention provide a system that can store and entrap bulky objects or objects that are not readily connectable to a smartkey, such as, but not limited to, medicine or the like.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

While the invention has been particularly shown and described with respect to preferred embodiments thereof, it will be understood by those skilled in the art that changes in form and details may be made therein without departing from the scope and spirit of the invention.

What is claimed is:

1. A storage system for storing and entrapping a plurality of objects, said system comprising;

a system housing;

at least two smartkey housings, each of which disposed within the system housing and operable to receive and releasably lock a smartkey therein;

at least two recesses, each recess being associated with a respective smartkey housing;

at least two smartkeys, each of which is associated with an object, each of the smartkeys comprising:

a body;

a memory device coupled to the body and comprising an individualized code; and an entrapping arm, coupled to the body, for entrapping an object positioned in the recess associated with the smartkey housing;

wherein when the object is positioned within its respective recess and the smartkey is positioned and locked in the smartkey housing associated with the recess, the entrapping arm prevents the object from being removed from the associated recess until the smartkey is removed from its respective smartkey housing at which time the object is removable from the recess.

2. The storage system as claimed in claim 1, including a plate, coupled to the system housing; and wherein the recesses are each formed within the plate.

3. The storage system as claimed in claim 1, wherein each recess is elongated so as to accept an object that is at least essentially the shape of a credit card.

4. The storage system as claimed in claim 1, wherein each recess is shaped so as to accept an object that is at least essentially the shape of a key.

5. The storage system as claimed in claim 1, wherein the recess is dimensioned so as to prevent a visual inspection of the entire object when the object is disposed in the recess.

6. The storage system as claimed in claim 1, wherein the object is coupled to the entrapping arm.

7. The storage system as claimed in claim 6, wherein the object is directly connected to the entrapping arm.

8. The storage system as claimed in claim 1, including an insert positioned within each of the at least two recesses; and wherein the object is disposed within the insert when the insert is positioned within the recess of the plate.

9. The storage system as claimed in claim 8, including a plate, within the system housing; and wherein the recesses are each formed within the plate.

10. The storage system as claimed in claim 8, wherein each insert is elongated so as to accept an object that is at least essentially the shape of a credit card.

11. The storage system as clued in claim 8, wherein each recess is shaped so as to accept an object that is at least essentially the shape of a key.

12. The storage system as claimed in claim 8, wherein the insert is dimensioned so as to prevent a visual inspection of the entire object when the object is disposed in the insert.

13. The storage system as claimed in claim 8, wherein the object is coupled to the entrapping arm.

14. The storage system as claimed in claim 1, wherein the smartkey comprises:

a coupler for coupling the entrapping arm to the body; and wherein the entrapping arm further comprises a unique identifier;

whereby if the entrapping arm is destroyed, damaged or decoupled from the body, an identical replacement-entrapping arm will be significantly difficult to obtain.

15. The storage system as claimed in claim 14, wherein the entrapping arm comprises surface indicia to indicate the unique identifier.

16. A storage system for storing and entrapping a plurality of objects, said system comprising:

a system housing;

at least two smartkey housings, each of which disposed within the system housing and operable to receive and releasably lock a smartkey therein;

at least two chambers, each chamber being associated with a smartkey housing, wherein each chamber has coupled thereto a door panel positionable in an open position where objects can be placed inside and at least a closed position where objects can be retained therein;

at least two smartkeys, each of which is associated with an object, each of the smartkeys comprising:

a body;

a memory device coupled to the body and comprising an individualized code; and an entrapping arm, coupled to the body, for entrapping the door in a closed position when the smartkey is positioned in the smartkey housing;

wherein the entrapping arm prevents the door from opening until the smartkey is removed from its respective smartkey housing.

17. The storage system as claimed in claim 16, including a plate, coupled to the system housing, the plate hang at least two openings, each opening being associated with a respective smartkey housing; and wherein each chamber is inserted into a respective opening in the plate.

18. The storage system as claimed in claim 16, wherein the door includes a slotted opening through which an object can be at least partially inserted.

19. The storage system as claimed in claim 18, wherein the opening is dimensioned so as to accept at least a portion of a key positioned therein.

20. The storage system as claimed in claim 19, wherein the opening is dimensioned so as to prevent a visual inspection of information associated with the key when the key is positioned in the slotted opening.

21. The storage system as claimed in claim 18, wherein the object is coupled to the entrapping arm.

* * * * *